May 22, 1928.

C. J. COBERLY 1,670,495

METHOD OF CUTTING SLOTS WITH ROTATING TIP

Original Filed March 17, 1924

INVENTOR:
CLARENCE J. COBERLY.
BY
ATTORNEY.

Patented May 22, 1928.

1,670,495

UNITED STATES PATENT OFFICE.

CLARENCE J. COBERLY, OF LOS ANGELES, CALIFORNIA, ASSIGNOR TO KOBE, INC., OF LOS ANGELES, CALIFORNIA, A CORPORATION OF CALIFORNIA.

METHOD OF CUTTING SLOTS WITH ROTATING TIP.

Original application filed March 17, 1924, Serial No. 699,944. Patent No. 1,554,407. Divided and this application filed November 17, 1925. Serial No. 69,609.

My invention relates to the cutting of slots in metal by use of an oxyacetylene or a similar cutting torch and it particularly relates to a novel method of cutting such slots.

This application is a division of an application presented by me to the Patent Office under the title of Cutting torch with rotating tip, filed March 17, 1924, Serial No. 699,944 now Patent #1,554,407.

It is an object of my invention to provide a method of cutting a slot in metal which is accomplished by revolving a jet of cutting gas around an axis.

It is a further object of my invention to provide a method of cutting a slot which has non-parallel sides.

Other objects and the especial advantages of my invention will be made evident hereinafter.

Referring to the drawing in which I illustrate an apparatus for conducting my invention, Fig. 1 is a vertical cross section through a cutting torch of my invention.

Figure 1:
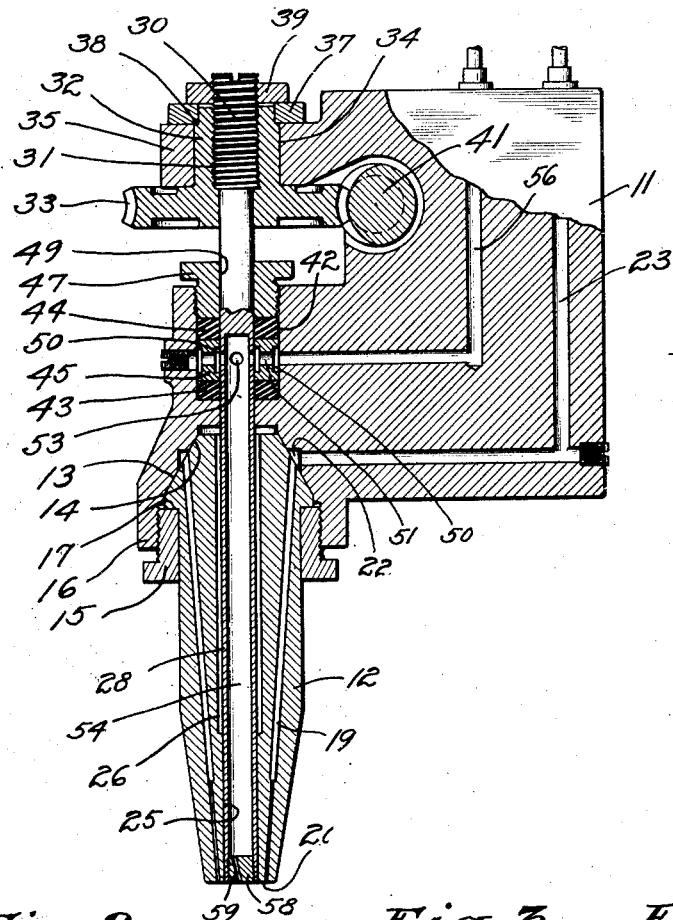

With reference to the drawing, 11 indicates a body to which a cutting tip 12 is rigidly secured. The cutting tip 12 has a head which provides a conical face 13 which is held in engagement with a conical face 14 of the body 11 by means of a bushing 15 which threads into a cylindrical projection 16 of the body 11 and engages an annular shoulder 17 of the tip 12.

Combustible gas passages 19 extend from a lower face 20 of the tip 12 to the conical face 13 thereof. The body 11 is provided with an annular channel 22 with which the upper ends of the combustible gas passages 19 join and provides a combustible gas passage 23 by means of which a combustible gas is supplied to the passages 19 of the tip 12.

Extending through a central axial opening 25 of the tip 12, which passage is released at 26, is a rotatable quill 28. The quill 28 extends upward through the body 11 and has a threaded head 30 which is threadably secured in a threaded opening 31 of a cylindrical projection 32 which extends from a worm gear 33. The projection 32 extends through a cylindrical opening 34 in a lug 35 which extends from the upper part of the body 11. A washer 37 surrounding the upper end of the projection 32 above the lug 35, is held against a shoulder 38 of the projection 32 by means of a nut 39 which is screwed onto the upper end of the head 30. The washer and nut 37 and 39 rotatably secure the worm gear 33 in place. A worm 41 rotatably supported in the body 11 engages the worm gear 33 for rotatably driving it.

In a cylindrical cavity 42 between packing 43 and 44 is a lantern 45. The packing 43 and 44 and the lantern 45 are secured in place by a gland 47 which is threadably secured in the upper end of the cavity 42 and which has a cylindrical opening 49 through which the quill 28 extends. The lantern 45 has inner and outer channels 50 which are connected together by a plurality of radially extending openings 51. The inner of the channels 50 connects with openings 53 which communicate with a cylindrical opening 54 formed in the lower end of the quill 28. The outer of the channels 50 connects with a cutting gas passage 56 which supplies gas by means of the lantern 45 to the interior of the quill 28. Threadably secured in the extreme lower end of the quill 28 is a delivery plug 58 having a delivery duct 59 formed therethrough. As clearly shown in Fig. 2, the duct 59 is formed on an axis 60 which extends at angles to the axis of rotation A—A of the quill 28.

The operation of my invention is substantially as follows:

The apparatus is first arranged so that the cutting tip 12 is in proper working position with respect to a plate of metal 62 in which a slot is to be cut. A mixture of combustible gas is supplied to the tip 12 through the passage 23; the combustible gas is lighted as it passes from the lower end 20 of the tip 12 and a preheating flame is thus produced. A constricted area of the plate 62 is preheated to a proper temperature by the preheating flame so that the cutting gas will combine with the metal to burn it away. The quill 28 is rotated by the driving mechanism shown and described preferably at a high rate of speed. When the metal is preheated to a proper temperature, cutting gas is supplied to the cylindrical opening 54 of the quill 28 through the passage 56 and the lantern 45.

A jet of cutting gas passes through the delivery duct concentrically with the axis 60 of the delivery duct 59. When the quill is in the position shown in Fig. 2, the cutting jet passing from the duct 59 cuts a side 63 of a slot 64 in the metal plate 62. When the quill 28 rotates half a revolution the axis 60 moves into a position indicated by the line 65 of Fig. 2, and the cutting jet will form a side 66 of the slot 64. As the quill 28 is revolved so that the delivery duct 59 is rotated around the axis A—A, the body 11 is moved along the metal plate 62, thus causing the rotating jet produced by the delivery duct to cut an elongated opening or slot in the plate.

Various formations of slots may be formed by my invention by changing the distance of the tip from the work or by changing the position of the delivery duct 59 with respect to the axis of rotation A—A of the quill 28.

Figure 2:
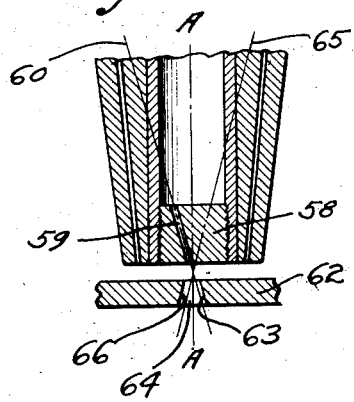
Fig. 2 is an enlarged fragmentary view of the lower end of the tip of the cutting torch of my invention showing the manner in which a wedge-shaped slot is produced.
Figure 3:
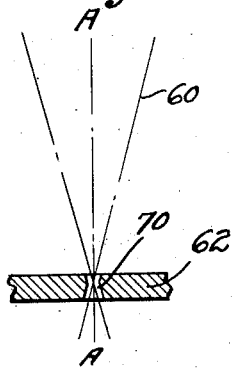
Figs. 3 and 4 are diagrammatic views illustrating different forms of slots which may be produced by the apparatus of my invention.
Figure 4:
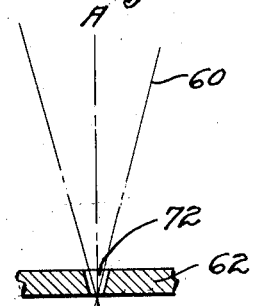

In Fig. 2 the axis 60 of the delivery duct 59 crosses the axis of rotation A—A at a point above the upper face of the plate 62; therefore, the slot 64 is wedge-shaped and narrowest at its upper face. In Fig. 3 I show a slot 70 which is formed when the axis 60 of the duct 59 crosses the axis of rotation A—A between the upper and lower faces of the plate 62. The slot is narrowest at an intermediate point, as clearly shown. In Fig. 4 I show a slot 72 which is formed when the axis 60 crosses the axis of rotation A—A at a point below the lower face of the plate 62. The slot 72 is wedge-shaped but is narrowest at the lower face of the metal.

The delivery plug 58 may be provided with a delivery duct which diverges from the axis of rotation to the lower face of the plug and may be utilized for cutting extremely wide wedge-shaped slots.

Also if desired the plug 58 may be provided with a duct which is parallel to the axis of rotation but eccentrically positioned so that a wide slot having parallel sides may be produced.

The important features of my invention reside in the rotation of a cutting jet around an axis and also moving the axis along a certain path during the rotation of the cutting jet therearound. This cutting jet may be either parallel to, or at angles with, the axis of rotation.

I claim as my invention:

1. A method of producing a slot in metal comprising: directing a jet into a metal; rotating said jet about an axis; and moving said jet and said axis relative to said metal.

2. A method of producing a slot in metal comprising: directing a jet into a metal; rotating said jet about an axis; and providing a relative movement of said axis and said metal.

3. A method of producing slots in a metal comprising: preheating an area of said metal; and forming an opening in said preheated area by use of a revolving cutting jet, said jet being also moved along the face of said metal.

4. A method of producing a tapering opening in metal comprising: directing a jet through the metal so as to intersect a given axis in a given angular relation thereto; and rotating said jet about said axis while said angular relation is maintained.

5. A method of producing a tapering opening in metal comprising: directing a jet through the metal in a given angular relation with a fixed axis; and rotating said jet about said axis while said angular relation is maintained.

In testimony whereof, I have hereunto set my hand at Los Angeles, California, this 10th day of November, 1925.

CLARENCE J. COBERLY.